United States Patent
Hoppesch et al.

[11] 3,877,291
[45] Apr. 15, 1975

[54] PORTABLE BREATH TESTER

[75] Inventors: Joseph P. Hoppesch, Schaumburg; Stuart A. Schubert, Rolling Meadows, both of Ill.

[73] Assignee: Borg-Warner Corporation, Chicago, Ill.

[22] Filed: Mar. 19, 1973

[21] Appl. No.: 342,566

Related U.S. Application Data

[63] Continuation-in-part of Ser. No. 280,927, Aug. 15, 1972, abandoned.

[52] U.S. Cl. ............ 73/27 R; 23/254 E; 340/237 R
[51] Int. Cl. .......................................... G01n 27/14
[58] Field of Search .............. 73/23, 27 R, 421.5 R; 23/232 R, 232 E, 254 R, 254 E; 128/2.07; 340/237 R; 324/71 SN

[56] References Cited
UNITED STATES PATENTS

| | | | |
|---|---|---|---|
| 3,338,087 | 8/1967 | Moberg et al. | 73/23 |
| 3,427,862 | 2/1969 | Hubner | 73/23 |
| 3,552,930 | 1/1971 | Borkenstein | 73/421.5 R X |
| 3,600,134 | 8/1971 | Noller | 73/27 R X |
| 3,695,848 | 10/1972 | Taguchi | 73/27 R X |

Primary Examiner—Richard C. Queisser
Assistant Examiner—Stephen A. Kreitman
Attorney, Agent, or Firm—James J. Jennings, Jr.

[57] ABSTRACT

A breath tester, in two embodiments, employing an alcohol detecting element (e.g. a zinc oxide semiconductor element) which, prior to use, is purged by pumping ambient air across it and maintaining it at a higher than normal operating temperature. In use, after a purging period the air pumping is stopped and the detector heaters are turned off, while breath is directed to the detector and any resulting change in properties (conductivity/resistivity) is sensed and signaled. The first embodiment is largely manually operated and uses a meter to signal both the breath alcohol concentration, and also the purged state of the detecting element. The second embodiment is largely automatic, includes timers and interlocks to prevent misuse, and employs lights to signal its outputs ("fail," for over one BAC level, "warn" for over a lower BAC level and "pass" for under that level) as well as its operational status ("power" on, "wait," "ready," "test"). Both embodiments may be battery powered and means for sensing and signaling the charge level on the batteries is disclosed.

17 Claims, 15 Drawing Figures

PATENTED APR 15 1975 3,877,291

PATENTED APR 15 1975 3,877,291

PATENTED APR 15 1975

PORTABLE BREATH TESTER

CROSS-REFERENCE TO RELATED APPLICATIONS

This is a continuation in part of Ser. No. 280,927, filed Aug. 15, 1972 now abandoned.

FIELD OF THE INVENTION

The present invention is directed to a new and improved breath tester and is especially concerned with a novel alcohol breath tester and method of treating the alcohol detecting element thereof to increase accuracy.

The present invention has resulted from a research program directed toward improving inebriate breath testing apparatus and methods. It is an improvement on or co-development with other inventions which are currently the subjects of pending patent applications. Some of these applications are: Ser. No. 136,921 entitled VEHICLE BREATH TESTING SYSTEM and filed on 4/23/71 in the names of Donald W. Collier, Joseph P. Hoppesch (one of the present inventors) and Anthony C. Mamo; Ser. No. 136,778 entitled BREATH TESTING SYSTEM and filed on 4/23/71 in the names of Donald W. Collier, Joseph P. Hoppesch (one of the present inventors) and Anthony C. Mamo now Pat. No. 3,764,270; Ser. No. 274,712 entitled BREATH TESTING SYSTEM WITH BREATH TEMPERATURE SENSOR and filed 7/24/72 in the name of John E. Murphy now Pat. No. 3,785,774; Ser. No. 181,805 entitled BREATH TESTER NULL MEMORY SYSTEM and filed on 9/20/71 in the names of Joseph P. Hoppesch (one of the present inventors), Donald H. Ward and James R. Tomashek; Ser. No. 107,407 entitled METHOD AND APPARATUS FOR OBTAINING ACCURATE READOUT OF BREATH TESTERS and filed on 11/10/71 in the names of Kenneth W. Padgitt and Donald H. Ward; and Ser. No. 213,141 entitled BREATH TESTING SYSTEM and filed 12/28/71 in the names of James E. Burroughs, Joseph P. Hoppesch (one of the present inventors) and James A. Nowak. All of these applications are assigned to Borg-Warner Corporation, the assignee of the present invention.

BACKGROUND

The general background of the invention may be found by referring to the previous cases and especially the first two listed above. The present invention is especially concerned with providing a small, portable, easily used "screening" type of breath tester and will be described here in that environment of use. However, at least some of the features and principles of the present invention are applicable to other types of testers and to differing environments of use and it is the intent to claim all of these as are justified by the present contribution to this art.

As presently envisioned, a screening type tester would be used, for example, by traffic policemen on the street or road to provide a basis for clearing, or for holding for a more elaborate test, a stopped motorist suspected of being intoxicated. A screening tester thus enables a police officer to rapidly administer roadside breath tests and results in a saving of the policeman's time. It also allows the stopped but innocent driver to proceed on his way sooner.

SUMMARY OF THE INVENTION

The present invention contemplates a breath tester wherein conditioning means are provided for both purging the detector of the residual effects of any previous tests and for conditioning the detector and means for sensing the conditioned state of the detector so as to allow its use in the conditioned state and thus increase the accuracy of the results obtained.

Additional features of the present invention which are believed to be novel are set forth hereinafter. The invention, together with the further advantages thereof, may best be understood by reference to the following description taken in connection with the accompanying drawings, in the several figures of which like reference numerals identify like elements.

DESCRIPTION

Figure 1:
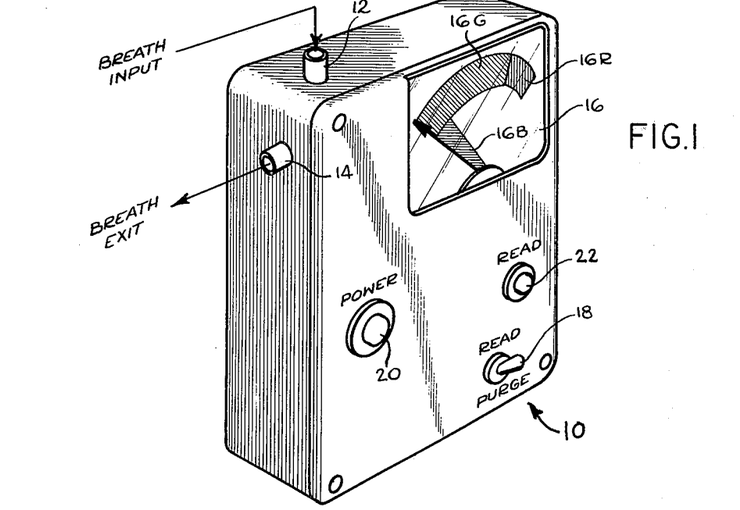
FIG. 1 is a perspective view of one embodiment of the present invention, a breath tester.

Referring to FIG. 1, there is depicted a breath tester, generally designated 10, which is constructed in accordance with the present invention. The tester 10 includes means for receiving breath, the input tube segment 12; a similar breath exit 14; output apparatus and signaling means, the meter 16; a command unit consisting of a two position switch unit 18, a power pushbutton 20, and a "read" pushbutton 22.

Figure 2:
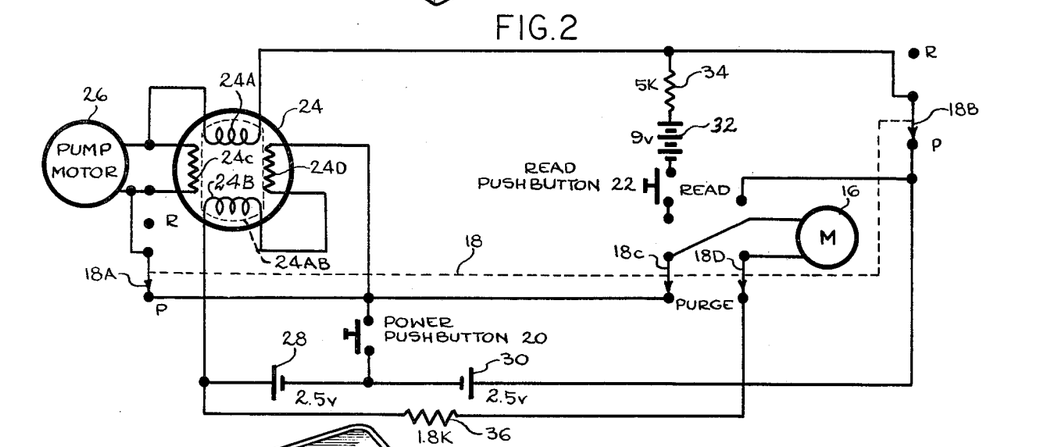
FIG. 2 is a circuit diagram of the breath tester of FIG. 1.

In FIG. 2, the electric circuit for the tester 10 is shown which includes a detector unit 24 which serves as means for detecting the breath alcohol concentration; a pump motor 26 which serves as means for purging the detector unit 24 by directing ambient air across it in response to the purge command of the ganged switch 18; power sources; batteries 28, 30 and 32, and current limiting resistors 34 and 36.

In more detail, the switch unit 18 includes four contact sets or switches 18A, 18B, 18C and 18D which are ganged to operate together. These are shown in the purge position. The detector unit 24 includes resistance element 24A and 24B in a body of semiconductor material (e.g. $Zn O_2$) to form a detecting unit 24AB, and heater resistances 24C and 24D which serve to elevate the temperature of the detector housing or cell. (This cell is preferably constructed as in the second embodiment as shown in more detail in FIG. 9.)

OPERATION OF THE FIRST EMBODIMENT

The cooperation and interconnection of the above identified elements may be best appreciated by going through the testing procedure. When it is desired to test a subject the switch 18 is put into the depicted purge position and power pushbutton 20 is pushed and held down thereafter by the operator (e.g. a policeman who has just stopped a suspected alcohol-intoxicated driver). This connects battery 28 across element 24B and heater resistor 24D. In addition the battery 28 is connected across the series connection of resistor 36 and meter 16 (through the purge contacts of the switches 18D and 18C).

The meter 16 serves to give a voltage reading of battery 28 and indicate its state of charge. If too low, as preferably marked on the signaling meter scale (FIG. 1), the test does not continue until it is reached (or in some cases replaced).

Holding the switch 20 closed also connects the battery 30 (through switches 18B and 18A) across the series-connection of element 24A and heater resistor 24C. As the motor 26 is connected across the resistor 24C it is also supplied with power.

The result is that the purge motor is energized to pump air across the detecting unit 24AB of detector 24 while the detector is supplied with power to heat it to an elevated temperature (e.g. 340°C) above its normal operating temperature (e.g. 270°C).

The operator continues to hold down the power pushbutton 20 for a period (e.g. 1 minute) and then moves the switch 18 to the read position. This opens the connections through switches 18A and 18B and connects (via 18C and 18D) the meter 16 in series with the switch 22, the battery 32 and the resistor 34. The operator, at about this time, also presses the read button 22 and observes that the meter 16 signal yields a low reading (e.g. in the zone 16B of FIG. 1). If this is not the case, he returns the switch 18 to its purge position and waits a further period (e.g. 15 or 20 seconds) and repeats this procedure.

Once an adequate purge has been obtained (as signaled by the above) the test proceeds by having the subject blow directly into inlet 12 and at the same time having the operator open switch 20 while continuing to press 22 closed. The sample should preferably include deep lung breath resulting from a continuous and uninterrupted exhaling into 12. The reading of the meter 16 will reflect the alcohol level in the breath and this meter is preferably scaled in red (16R) for reading over the legally intoxicated blood alcohol concentration (BAC) level and in green (16G) for those below that level.

During the purge indicating and test-read stages described above, the meter 16 is reading the current in a circuit consisting of a series connection from element 24A over resistor 34, battery 32, switch 22, meter 16, battery 30, and a connection to the element 24B (a parallel connection of 20, 24D and 28 exists in the purge indicating stage, and a series connection through 28 in the test-read stage). This circuit is completed through the semiconductor material of detector 24 between elements 24A and 24B which now function as electrodes. Thus the meter 16 is in effect reading the resistance across the preheated detector 24AB. In the testing stage any alcohol present in the gas directed across the semiconductor element will result in a drop in the resistance and a high meter reading. Normal non-alcohol containing breath, however, will not cause this effect.

In the tester of FIGS. 1 and 2 several additional features may be employed. A breath input unit such as that disclosed in the aforementioned Ser. No. 136,921 application could be used at 12 or a simple plastic mouthpiece can be used. The subject could blow up a balloon attached at 14 or sound a whistle attached there. There is no need, however, that the subject blow directly into 12. His breath sample could be taken in a convenient receiver (as by blowing up a balloon or filling a piston-chamber or other reservoir) and thereafter inserted into 12.

THE SECOND EMBODIMENT

Figure 3:
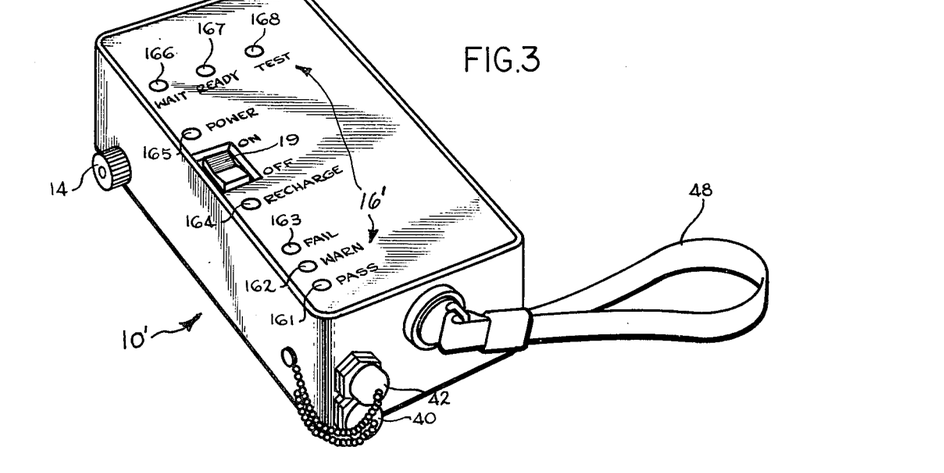
FIG. 3 is a perspective view of another breath tester constituting a second embodiment of the invention.

In FIG. 3 a second embodiment of the invention is depicted which is specifically adapted to have the subject blow into it. This tester is generally designated 10' and is more automatic and error-proof in its operation. Included as its signaling means 16' are a number of light emitting signaling units designated by the numbers 161 through 168 and preferably labeled as shown. The control means consists of a simple on-off switch 19, with all other functions being automatic in response to the proper breath input.

Figure 9:
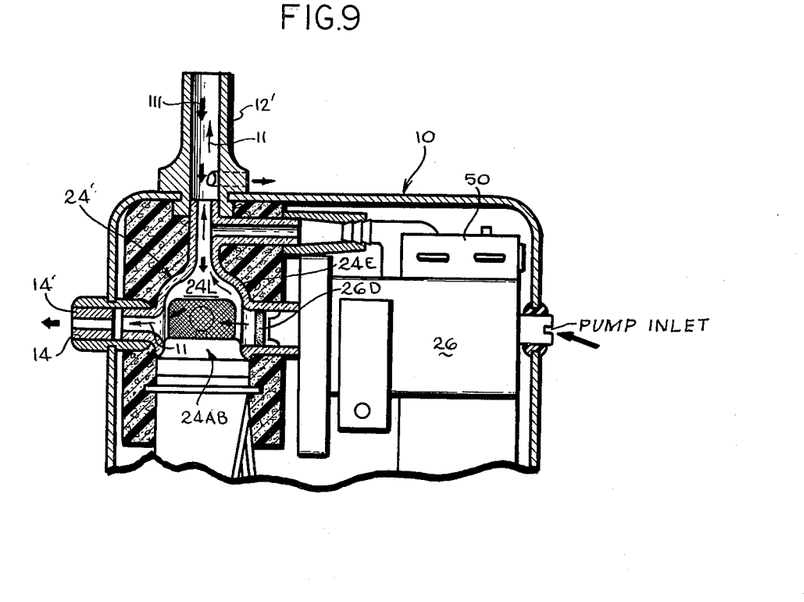
FIG. 9 is a semi-cross-sectional diagramatical fragmentary representation of the internal mechanical layout of the tester of FIGS. 3 and 4 which representation is useful in explaining the operation of the present invention.

As shown in FIG. 3, the tester 10' also includes a pair of connector plugs 40 and 42 which are disconnectable. (These plugs may be, as shown, secured against loss, when disconnected, by being attached to the housing. Further, the tester could be fitted with a carrying strap 48). Although visible in FIG. 3, the tester 10' also includes a breath input 12' and a purge pump air input. Both of these as well as the arrangement of the detector 24 and pump 26 are shown in FIG. 9.

Figures 4A, 8:
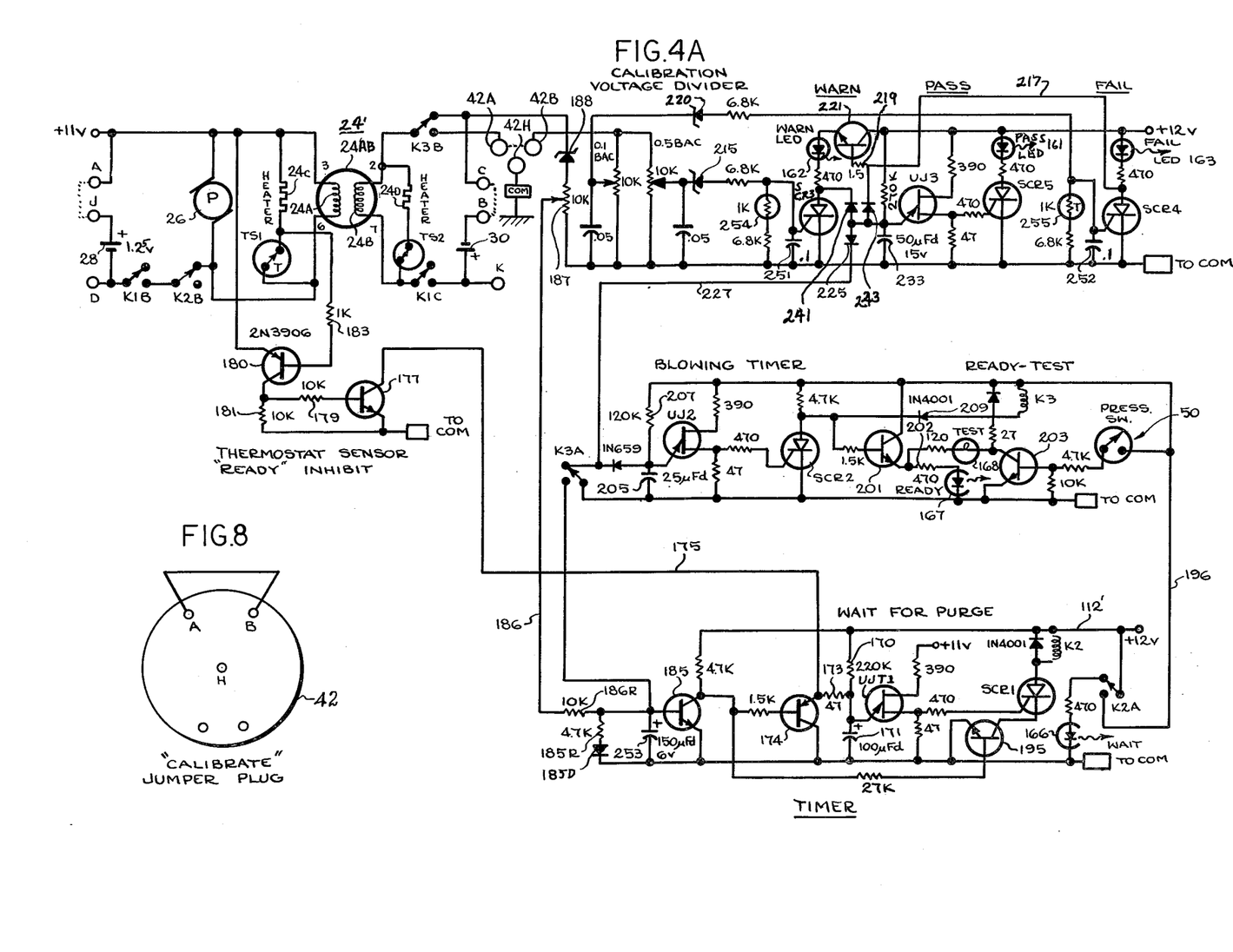
FIGS. 4A and 4B are diagrams of the electrical circuits contained in the tester of FIG. 3.
FIGS. 6–8 are connection diagrams for inserting connectors or plugs used with the tester of FIGS. 3 and 4.

In FIG. 4A the operational circuit of the tester is depicted including a detector unit 24' with separate adjacent cell heater resistance elements 24C and 24D and internal sensor elements 24A and 24B. The tester 10' includes a breath flow sensor, the pressure switch 50, which functions as described and claimed in the above-mentioned co-pending U.S. patent application Ser. No. 136,778.

The pressure switch 50 is part of a "Ready-Test" circuit which includes the "Ready" light emitting (Led) diode 167 and the "Test" lamp 168. The switch 50 serves, when closed, to light both 167 and 168, energize a relay coil K3 and to start a resetable blowing timer circuit. The remainder of the circuitry of FIG. 4A, as will be explained in detail below, serves to automatically perform the operations manually performed in the embodiment of FIGS. 1 and 2 as well as several additional operations.

Figure 4B:
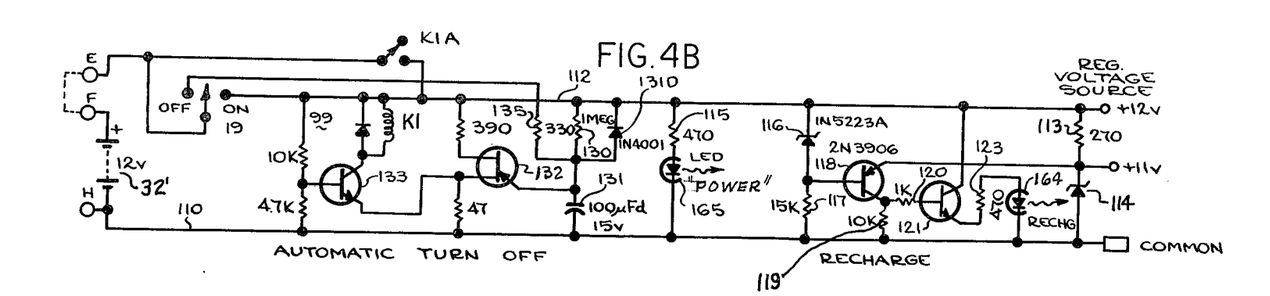

In FIG. 4B additional features of the tester 10' are detailed. These include an automatic turn off circuit designed to prevent the batteries of the tester 10' from being needlessly run down by a forgetful operator. After a preset time period (e.g. 3–4 minutes) this timer deenergizes the unit. An automatic sensing and signaling (recharge light 164) battery condition indicating circuit designated "Recharge" is also provided. The circuit of FIG. 4B includes, in addition to the Recharge and Automatic Turn Off circuits, a battery 32', the control switch 19 and also a regulated voltage supply (designated +11V) for the circuit of FIG. 4A.

Figure 6:
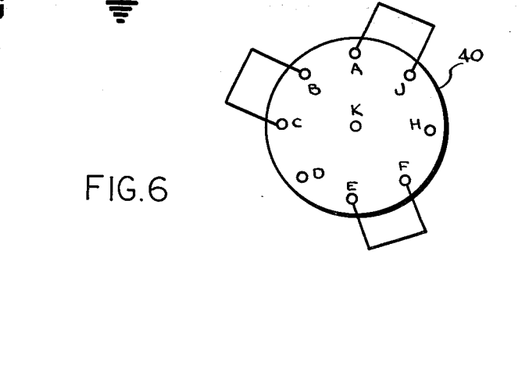

The circuits of FIGS. 4A and 4B include a number of terminal points designated by the letters A, B, C, D, E, F, H, J and K. These refer to terminal contacts of the receptacle for the jumper plug 40. In FIG. 6, the interconnection of one plug 40 is shown wherein terminal pairs A and J, B and C, and E and F are electrically connected together while D, K and H are electrically not connected.

The particular plug of FIG. 6 is the operation plug showing the interconnects and non connections of the various corresponding terminal points of FIG. 4 used in the operating or testing mode for the tester 10'.

Figure 7:
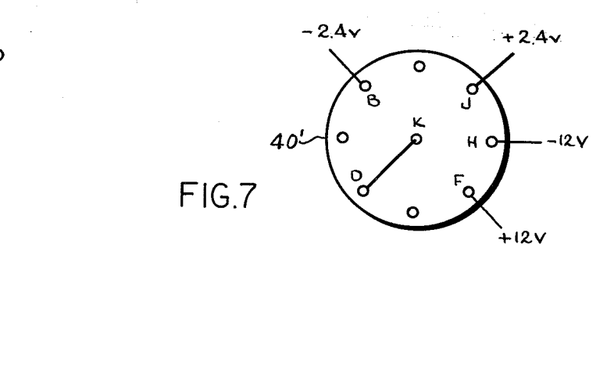

FIG. 7 details the charging plug 40' which is substituted for the plug 40 when recharging the batteries of the tester 10'. In this case, the terminal pins B, J, H and F are externally connected to two suitable supplies of d.c. voltages (e.g. 2.8V, and 13.5V) while pins K and D are connected together.

Figure 5:
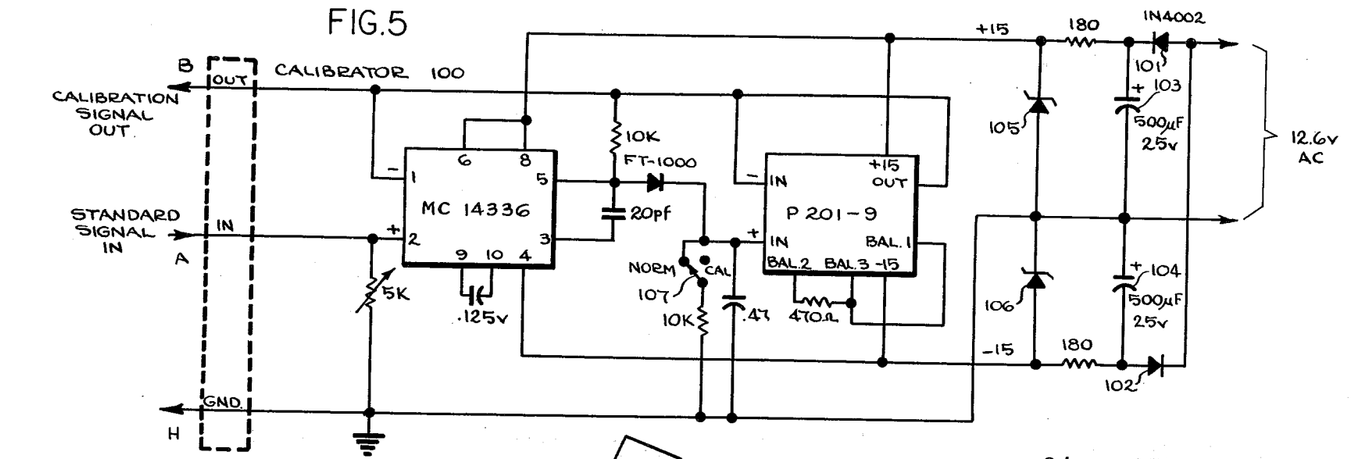
FIG. 5 is a circuit diagram of an external calibration system for use with the tester of FIGS. 3 and 4.

FIG. 8 represents the plug 42, in which only receptacles A, B and H are employed (FIG. 4A). The plug 42 is preferably a different type (e.g. a 5 pin plug) than the plug 40 to prevent mixing. The plug 42 serves, during operation, to connect terminals A and B. For calibrating the tester 10', an external calibration unit 100, depicted in FIG. 5, is employed. During calibration, the terminals B, A and H of this unit 100 are connected to the corresponding pin receptacles (FIG. 4A) in place of the plug 42 while suitable (e.g. 12.6v a.c.) power is supplied to its input while a standard gas sample is supplied to the tester 10'. The unit 100 is made up of a rectifier (diodes 101, 102), filter (capacitors 103, 104), and voltage regulator zener diodes 105, 106) to supply regulated common positive (line +15) and negative (line −15) voltages to two integrated circuits (MC 14336 and P 201-9). These circuits serve as a voltage peak storage holding unit. A switch 107 serves to discharge the holding capacitor (.47 microfarad) after calibration or for a second calibration (as for another tester unit).

DETAILED OPERATION OF SECOND EMBODIMENT

In more detail and in reference to FIG. 4A and 4B, a typical testing procedure will now be set out, assuming the tester 10' has not been used for a period. In this case the operation plug 40 of FIG. 6 and the calibration plug 42 of FIG. 8 are positioned in their receptacles or sockets to connect these terminal pairs: A and J; B and C; E and F (FIG. 4B); and 42A and 42B, together. These connections are indicated in FIGS. 4A and 4B by dotted lines. The operator first operates on-off switch 19 (FIG. 4B) to on. The switch 19 is preferably a momentary rocker type of switch which is mechanically biased to the central (no contact) position but can be pushed to contact either the "on" or "off" terminals. Pushing it to the "on" terminal connects the battery 32' through E and F (as shown by dotted line) across the lines designated 110 and 112 and supplies voltage to a latching circuit 99 including a relay coil K1. This coil is energized to close relay switch K1A and connect the battery 32' to line 112 even after the operator removes pressure from the switch 19. Voltage is thus fed over line 112 to the regulated voltage source (resistor 113 and zener diode 114), to the recharge sensing circuit, to the remaining automatic turn-off circuit, and (through a resistor 115) to the "power" LED 165. This led lights and remains lighted to indicate that the unit is operating.

The Recharge Circuit includes another zener diode 116 connected in series with a resistor 117 between lines 112 and 110 to provide voltage relative to line 112 at the junction of 116 and 117. This junction is connected to the base of a PNP transistor 118 whose emitter is connected to the +11V regulated line and whose collector is connected both through a large resistor 119 to ground and through a smaller resistor 120 to the base of an NPN transistor 121. The transistor 121 has its emitter-collector circuit connected in series with current limiting resistor 123 and the recharge signaling LED 164. In operation when the voltage between lines 112 and 110 falls below a preset (by selecting 116) value the transistor 118 is biased into conduction which causes transistor 121 to conduct and the LED 164 to be energized. For example, for a nickel cadnium nominal 12V battery 32', which produces a voltage of about 12.5 volts, a zener 116 is chosen such that the Recharge Circuit will energize LED 164 for voltages across 112 and 110 of less than approximately 12 volts which indicates a low charge level on the battery 32'.

The Automatic Turn-off circuit is essentially a timer made up of an RC time circuit (resistor 130 and capacitor 131) connected across 112–110. A unijunction transistor 132 is fired when the voltage across the capacitor reaches a preset level. Firing of 132 turns off a transistor 133 (part of latching circuit 99) to deenergize K1 and open K1A to remove the connection to line 112.

Note that pushing the switch 19 to its off contact serves to place a small resistor 135 in parallel with the large timing resistor 130 and to shorten the time period to virtually instantaneously fire the unijunction transistor 132 and turn off the tester. The diode 131D serves as bypass discharge path across the large resistor 130 for the capacitor 131.

Referring now to FIG. 4A, the connection of the battery to line 112' also connects this voltage (e.g. 12V) and the other regulated voltage (e.g. 11V) to the terminals there designated. Energization of the latching relay K1 also serves to close a second relay switch k1B which connects the purge pump motor 26, through the normally closed contact of a relay switch K2B, across the battery 28 (which may be a nickel cadmium battery, terminals A and J being jumped by 40 as indicated by the dotted line). The purge motor 26 is started and power is also supplied to elements 24A of the detecting unit and heater resistance 24C of the detector cell which are here both connected in parallel with the pump motor 26. The branch of cell-heater element 24C includes a thermostat switch TS1 which opens when the detector housing or cell reaches a preselected high temperature (e.g. 100°F).

TS1 is connected (through K2B and K1B) to the negative terminal of the battery 28 while the other end of the element 24C is connected to the +11V source as well as the positive terminal of the battery 28. The junction of 24C and TS1 is connected to a Thermostat Sensor "Ready" Inhibit circuit which circuit will inhibit a ready condition if the cell has not reached a preset temperature.

Relay coil K1 (FIG. 4B) also closes switch K1C (FIG. 4A) to connect the battery 30 (through C-B, and the normally-closed contact of K3B) across the sensor element 24B of the detecting unit 24AB. connected in parallel across element 24B and the battery is the series connection of a second cell-heater element 24D and a thermal switch TS2. (This switch TS2 serves as a thermostat to prevent 24D from overheating the cell.)

In summary to this point, turning "on" the power switch has lit the "on" LED, started the automatic turn off timer (which will turn off the tester after a desired period if it is not previously manually turned off), started the purge pump 26, supplied power to the elements 24A and 24B of the detecting unit and to the cell heater elements 24C and 24D to heat them. It has also supplied power to the Warn, Pass, Fail and Wait Circuits although except for the latter, none of these have yet operated. No power has yet been coupled to the Ready-Test or Blowing Timer Circuit.

The supply of power for line 112' of the Wait for Purge circuit has resulted in the lighting of the "Wait" LED 166 (connected through the NC contact of a switch K2A), but has not initially started its timer. The Wait timer is made up of the series connection of resistor 170 and capacitor 171 between lines 112' and common or reference voltage line designated "COM" (sometimes also termed herein "ground"). The junction of 170 and 171 is connected to the gate of a Unijunction Transistor, UJT1, which is connected to fire a silicon controlled rectifier SCR1. However, initially the capacitor is kept from charging by two drain connections to COM (through the small resistor 173). One of these connections (via line 175) from the Thermostat Sensor "Ready" Inhibit circuit and the other is through the emitter-collector circuit of a transistor 174.

The Thermostat Sensor "Ready" Inhibit circuit includes an NPN Transistor 177 in a grounded emitter configuration with line 175 connected to its collector and its base connected (through resistor 179) to the collector of a PNP transistor 180 (which collector is also connected through resistor 181 to COM). The emitter of 180 is connected to +11V and its base is connected (through resistor 183) to the junction of TS1 and 24C.

In operation, the Thermostat Sensor "Ready" Inhibitor circuit serves to keep line 175 "grounded" until TS1 opens. This is because 180 and 177 are biased into conduction by the lower voltage at the connection of TS1 and 24C with TS1 closed, but when TS1 opens, the bias at the base of 180 goes to +11V and the non-conduction of 180 biases 177 off. This effectively isolates line 175.

Thus, the timer of the Wait circuit can be started only if TS1 senses that the detector housing or cell has reached a preselected temperature.

However, for the Wait circuit timer to operate, it is also required that the resistance across the sensor elements 24A and 24B be increased to a high value (indicating that the conditioning is complete). This rise in resistance (or fall in conductance, which is the reciprocal of resistance) will be explained in more detail in connection with FIG. 12. The conductance/resistance is continuously sensed (after the closure of the power switch 19) by the part of the Wait circuit including the NPN transistor 185.

The transistor 185 has its base connected through a resistor 185R and diode 185D to ground and, via a resistor 186R, line 186, the tap of a potentiometer 187, a zener diode 188 and the N.C. contacts of switch K3B to the element 24B. The element 24A is connected to the voltage source 11V. When the resistance between 24A and 24B is high, the zener 188 does not break down and the base of 185 is held at about ground (COM) potential, i.e. transistor 185 is "off." However, whenever the resistance between 24A and 24B goes low the diode 188 breaks down and 185 is turned "on."

Thus, after turning the tester 10' on, the timer of the Wait circuit is prevented from being started until the detector housing or cell reaches an elevated temperature (TS1 is open) and the resistance between 24A–24B of the sensor has signaled that it is conditioned. This typically may take 60 seconds.

When both of these events are properly signaled, the capacitor 171 begins to charge and a further safety delay period (e.g. 15 seconds with pump 26 running, elements 24A and 24B heated by batteries 28 and 30) is provided to further insure that the purge and conditioning has occurred. The timer also serves to prevent a false READY signal from occurring in a state where the detector cell is at operating temperature but the detecting unit 24B is below operating temperature and the resistance between 24A and 24B may be high. After this timing period (e.g. 15 seconds) UJT1 fires SCR 1 to energize Relay K2. (A transistor 195 is provided for turning SCR 1 off and preventing it from being fired in response to transistor 185 being "on.")

If at any time during the Ready period the sensor drifts from the conditioned state, this will be detected by transistor 185 which will turn "on" and thus turn "off" transistor 195 and SCR 1. When the sensor is reconditioned, the timer will again start and after the timed period fire SCR 1 again.

Energizing of K2 operates switches K2A and K2B. K2B opens the circuit from 28 to pump motor 26 heater 24C and detecting unit element 24A. The power to the sensor is detecting unit 24AB now reduced to a normal level (sufficient to maintain the conditioned state). The operation of K2A turns "off" the wait light 166 and provides voltage (over 196) to the Ready-Test and Blowing Timer circuits.

This results in the "Ready" light LED 167 being lighted and "arming" the breath pressure switch 50 for operation. Blowing of breath into the inlet 12' for the predetermined period (e.g. 5 seconds) to obtain deep lung breath operates the blowing timer to allow a pass to be signaled (as Led 161 lights) and only if the breath sample tested does not cause the detector 24AB to signal a BAC (blood alcohol concentration) level sufficient to indicate that an intermediate state (e.g. 0.05% BAC) of intoxication exists (as "Warn" LED 162 lights) or that an advanced level (e.g. 0.1% BAC — preferably the legally defined intoxication level for police use) has been reached (light "fail" LED 163).

In more detail the Ready-Test circuit includes a transistor 201 which is turned "on" by the presence of voltage on 196 to energize (through a resistor 202) the LED 167. (201 and 167 are turned "off" by the firing of an SCR 2 by the blowing timer.) Closure of the pressure switch 50 turns "on" as NPN transistor 203 which lights the Test lamp 168 connected to line 196 through transistor 201, and energizes a relay coil K3. This coil operates a switch K3A in the Blowing Timer circuit to remove a grounding connection to a timing capacitor 205 and allow it to charge (through a resistor 207). K3A then grounds the base of 185 to guard against the detection of alcohol in the breath from operating the Wait for Purge Circuit. When the proper period has passed (without the pressure switch 50 reclosing to reset the blowing timer) the UJ2, connected to the capacitor, is fired to turn "on" SCR 2, which turns "off" the LED 167 and Test lamp 168 and latches "on" (via diode 209) the coil K3.

(As will be explained below, SCR 2 may also operate a lock-out circuit to prevent any of the signals from Led's 161, 162, or 163 in the absence of a proper breath sample.)

The turning "on" of SCR 2 effectively grounds the base of 201 turning it "off" and consequently extinguishing the Ready LED 167 and Test lamp 168.

The breath exposed to the detector 24' at this instant is the result of a continuous and uninterrupted flow (over the threshold level of switch 50) for a predetermined period and is effectively deep lung breath.

K3B operates to remove power from sensor element 24B and cell heater 24D. It was found that the sensor was less subject to error caused by blowing pressure and over blowing if its heaters were off during this period.

The output of detector 24B in response to this breath yields an accurate indication of BAC and it is this output that is now used to derive and signal "fail" or "warn".

The Warn circuit comprises an SCR 3 which is triggered by the break down of a zener diode 215 which is connected by the switch K3B (in an essentially similar arrangement as was the diode 188) to the detector 24A-24B and 11V circuit. If the resistance of the detector 24AB falls in response to alcohol expelled on it, a predetermined voltage (determined by 215 and the adjustable and fixed resistance network associated with it) will cause the SCR 3 to be turned "on" to light the Warn LED 162.

Similarly the Fail circuit includes a zener diode 220 connected in a similar circuit to the detector 24AB. If the resistance 24A-24B falls to a still lower level in response to the alcohol the zener break down occurs and an SCR 4 is fired. The firing of SCR 4 energizes the series connected LED 163 and signals a "fail."

In addition, the energization of SCR 4 effectively grounds (over a line 217 and through a resistor 219) the base of an NPN transistor 221 whose emitter-collector circuit is in series with the LED 162 and SCR 3. (This transistor 221 is biased "on" in the absence of SCR 4 being "on"). This results in the Warn signal LED 162 being turned "off" whenever a "fail" signal is given and prevents any possible misinterpretation of the test results. (Of course, this latter feature is optional and could be eliminated by defining one light as a warn and two as a fail or by some similar arrangement.)

The Pass circuit is a simple RC timer (231, 233) with a UJ3 firing another SCR 5 which is in series with the Pass LED 161 and the +12V supply. The timer is started by removal of a grounding connection (through diode 225 and line 227) by the opening of K3A in response to the closure of the pressure switch 50. (Should the blowing stop before the blowing timer circuit latches on the relay K3, K3A grounds out and discharges capacitor 233 to also reset the Delay Pass Timer.) The time period is longer than the blowing timer (e.g. 20 seconds compared with 5 seconds) so that a sufficient time is allowed for the "Warn" or "Fail" signal LEDs to be lighted before the period is over. If these are not lighted in that period, UJ3 fires to turn "on" SCR 5 which completes the circuit from the +12V supply through LED 161 and lights it. However, should either the "warn" or "fail" signals be given (SCR 3 or SCR 4 turned "on") then the pass delay timer is turned off (its timing capacitor 233 is grounded through a diode 241 and SCR 3 or through a diode 243, line 217 and SCR 4).

Small delays (capacitors 251, 252, 253) are provided to prevent the warn, fail or purge indicating circuits from responding too quickly to signals from the detector and to protect against transient signals. Temperature compensation can be provided (thermistors 254, 255 and diode 185D) to further increase the accuracy of the unit under varying ambient temperatures.

Referring now to FIG. 9, it can be seen that the detector unit 24' includes a detecting unit 24AB which contains the semiconductor bead with the elements 24A and 24B encapsulated therein. The bead is covered by a mesh protective cap and mounted on a base. The detecting unit 24AB is in a Cell 24L defined by a glass envelope 24E. As better shown in the detail (FIG. 10) the resistive heater elements 24C and 24D are formed by being fused on the outside of the glass envelope (a suitable cover 24V of e.g. Teflon insures electrical isolation).

The envelope 24E defines four openings connected respectively to the breath inlet 12', the breath outlet 14, the pressure switch and the pump 26. A metal diffusor 26D is provided in this latter to diffuse the purge air about the Cell 24L. The pump 26 includes a one-way to prevent back flow.

In FIG. 9, although not necessary, a small diameter (e.g. 1/8 inch) hole is provided in the input 12' parallel to the top of the casing and extending through the thicker part of the input tube's side wall. This provides a breath dumping or venting path and reduces the flow through the Cell 24L.

During the purge cycle, air is taken in at the Pump Inlet and propelled as indicated by the thin shaft arrows 11 through and over the detecting unit 24AB and out both the passages 12' and 14. During use the subject's breath is propelled as shown by the thick shaft arrows 111 to, through and over the detecting unit 24AB and out the exit 14.

The thermostats TS1 and TS2 are preferably mounted on the outside of the envelope 24E, adjacent to the surface, on either side of detector 24'.

Surrounding the thermostats and the detector 24' is a layer of heat insulating material (e.g. a half of an inch layer of polyurethane foam).

An orifice 14' is provided as means for controlling the breath flow through the Cell 24L. If the orifice 14' is made relatively large, applicants have discovered that the detecting unit is relatively insensitive to the time the subject spends in blowing in his sample (e.g. 5 or 7 or 10 seconds). However, to maintain the unit relatively insensitive to blowing pressure, the size of this orifice should be kept small.

Figures 10, 11:
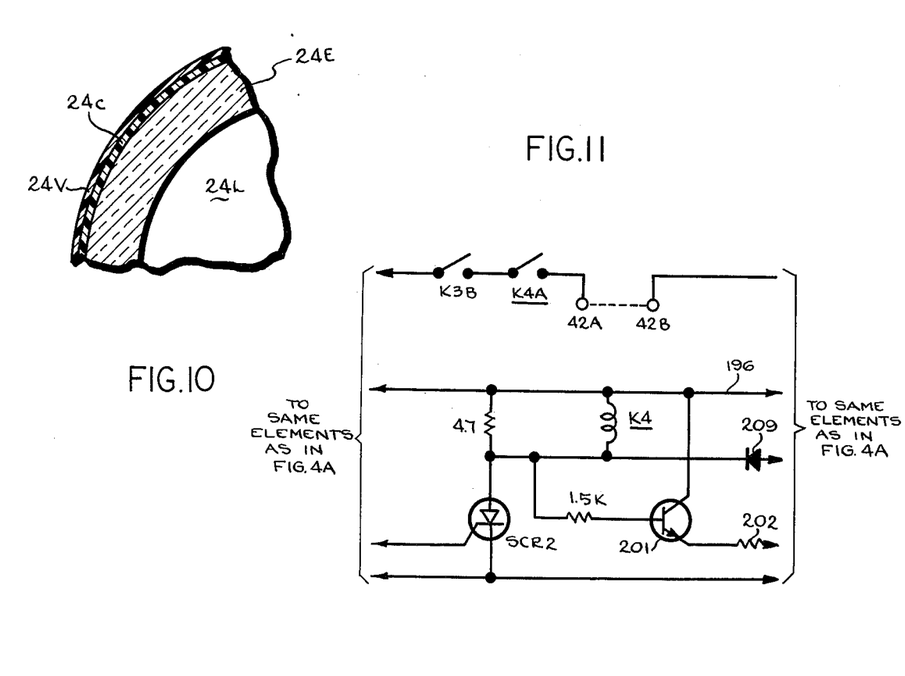
FIG. 10 is an enlarged detailed view of a portion of FIG. 9.
FIG. 11 is a fragmentary circuit diagram showing an optional circuit change from the circuit of FIG. 4.

A desirable optional addition to the circuit in FIG. 4A is, as shown in FIG. 11, a relay coil K4 connected between line 196 of the Ready-Test Blowing Timer circuit and the anode of SCR 2. This relay has a set of switch contacts K4A which are normally open and are connected in series between K3B's normally open contact and 42A. The purpose of this circuit addition is to prevent a Warn or Fail display until the blowing requirement has been met.

The detecting unit 24AB is made of a material which, like zinc or tin oxides, after conditioning in the purge cycle of the present invention, exhibits a marked change in its properties or characteristics. Broadly, while other characteristics may be employable, the present inventors prefer the resistivity decrease of semiconductor materials.

The unit 24AB comprises a body of porous, gas permeable semiconductor material which surrounds and extends between the elements 24A and 24B. The semiconductor materials used in the detecting unit 24AB are of the reduction type. This material is N-type metal oxide semiconductor material, such as $SnO_2$, ZnO, $Fe_2O_3$ and $TiO_2$, of which ZnO and $SnO_2$ are preferred.

Figure 12:
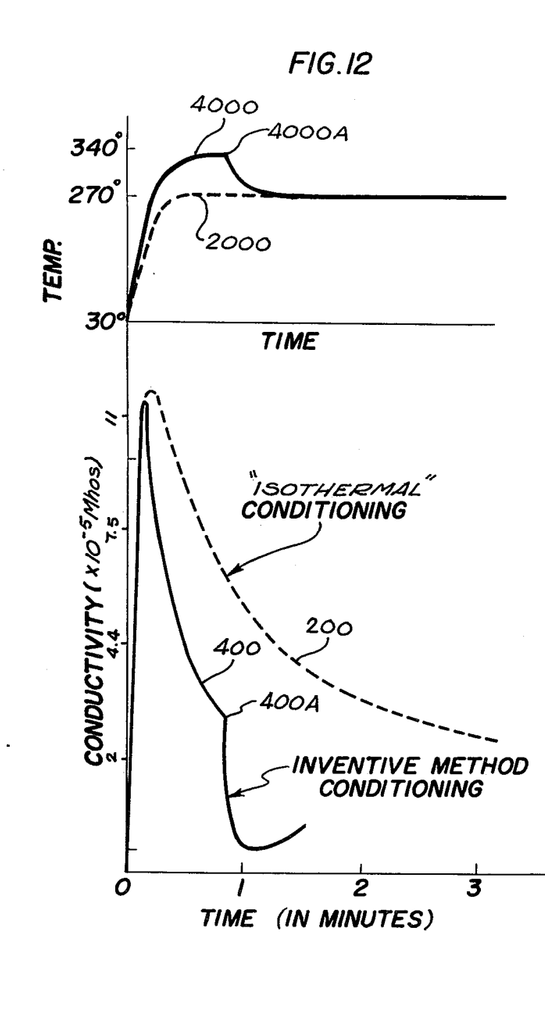
FIG. 12 is a graphical representation of the relationship with respect to time of conductivity and temperature of the same detecting element operated in accordance with the invention and in conventional manner, during a typical "conditioning" prior to use.

The operational advantage of the current invention may be appreciated by referring to FIG. 12 wherein the lower portion the conductivity versus time characteristic of a specific Taguchi (basically $SnO_2$) detecting element is depicted for two cases. The dashed line 200 is a plot of the response of a detecting unit exposed in ambient air and heated in the manner suggested by the manufacturer (i.e. one of the elements 24A or 24B powered) from a time starting at "0" on this graph. Note that the time axis is in minutes. Now typically well over 4 minutes are required for a "cold" device to be "conditioned" (reach a conductivity of, e.g. approximating $1.5 \times 10^{-6}$ mhos) These curves were taken from a strip chart recorder's output.

Curve 400 illustrates the conductivity for the detecting unit 24AB as used in the tester 10' of the present invention. Initially with both heater elements 24A and 24B powered the detecting unit 24AB temperature rises to a higher level than the "working" temperature of this detecting unit. In this case the detecting unit is being conditioned after non-use. Initially with both heater elements 24A and 24B powered the detecting unit 24AB temperature rises, as shown in the upper part of FIG. 12 by the curve 4000 (corresponding to the curve 400) at a more rapid rate than the rise shown in curve 200 (corresponding to the curve 200) from ambient temperature (e.g. 30°C, room temperature). The temperature is driven higher to an elevated temperature, e.g. 340°C. This is a higher temperature than the "working" (approximately 270°C) temperature for this detecting unit. (The unit could not be successfully used to test for alcohol at this elevated temperature.)

At points 400A and 4000A (which occur at the same time) the powering of the element 24A and the pump 26 ceases. This results in a drop in the temperature of the unit 24AB and a rapid decline in conductivity to a low level, which is much lower than that achieved by single element heating method (curve 200) even after five or more minutes. The theoretical explanation for this discovery is presently unknown to applicants.

Thus, conditioning in accordance with the present invention not only results in a quicker "ready" state, but also in a lower ready state conductivity. It also appears to be related to the improved accuracy and precision.

Figure 13:
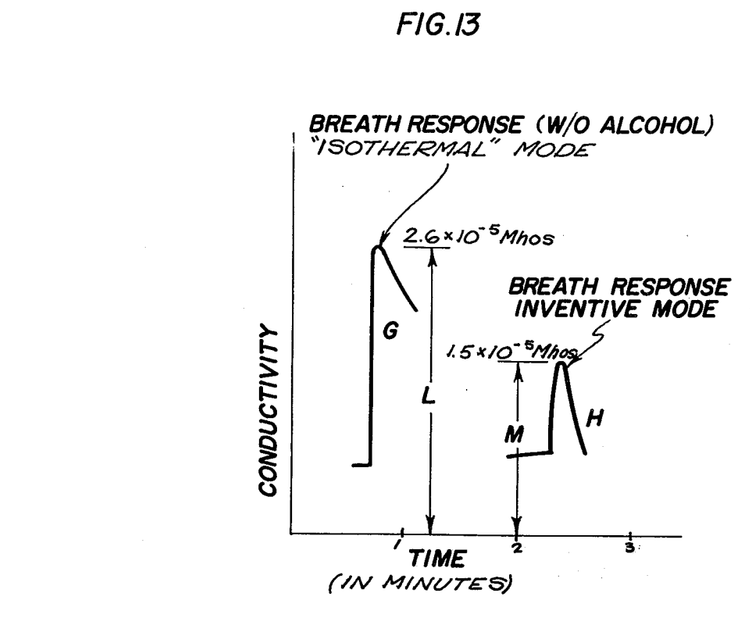
FIG. 13 is a graphical representation of the relationship, with respect to time, of the conductivity of the same detecting element operated in two manners when exposed to non-alcohol containing human breath.

Further, as shown in FIG. 13, the invention's feature of lowering the temperature when exposing the detecting unit to a breath sample results in a relatively lower response for human breath samples containing no alcohol than otherwise. This is a desirable feature. In FIG. 13, the curve G shows the response to a human breath sample of the Taguchi detecting element after being conditioned while maintained at its normal working temperature (about 270°C). The curve H depicts the response of the same detecting unit 24AB to a similar breath sample in the system of the present invention. That is, with both the heater elements off at the instant that the breath sample comes in contact with the detector. The maximum absolute amplitude L of the curve G is 1.7 times the maximum absolute amplitude M of the curve H. As will be shortly apparent from a discussion of FIG. 14, this is an advantage as it yields a greater ratio of alcohol-containing breath to non alcohol-containing breath amplitudes for the invention than for the prior system.

Figure 14:
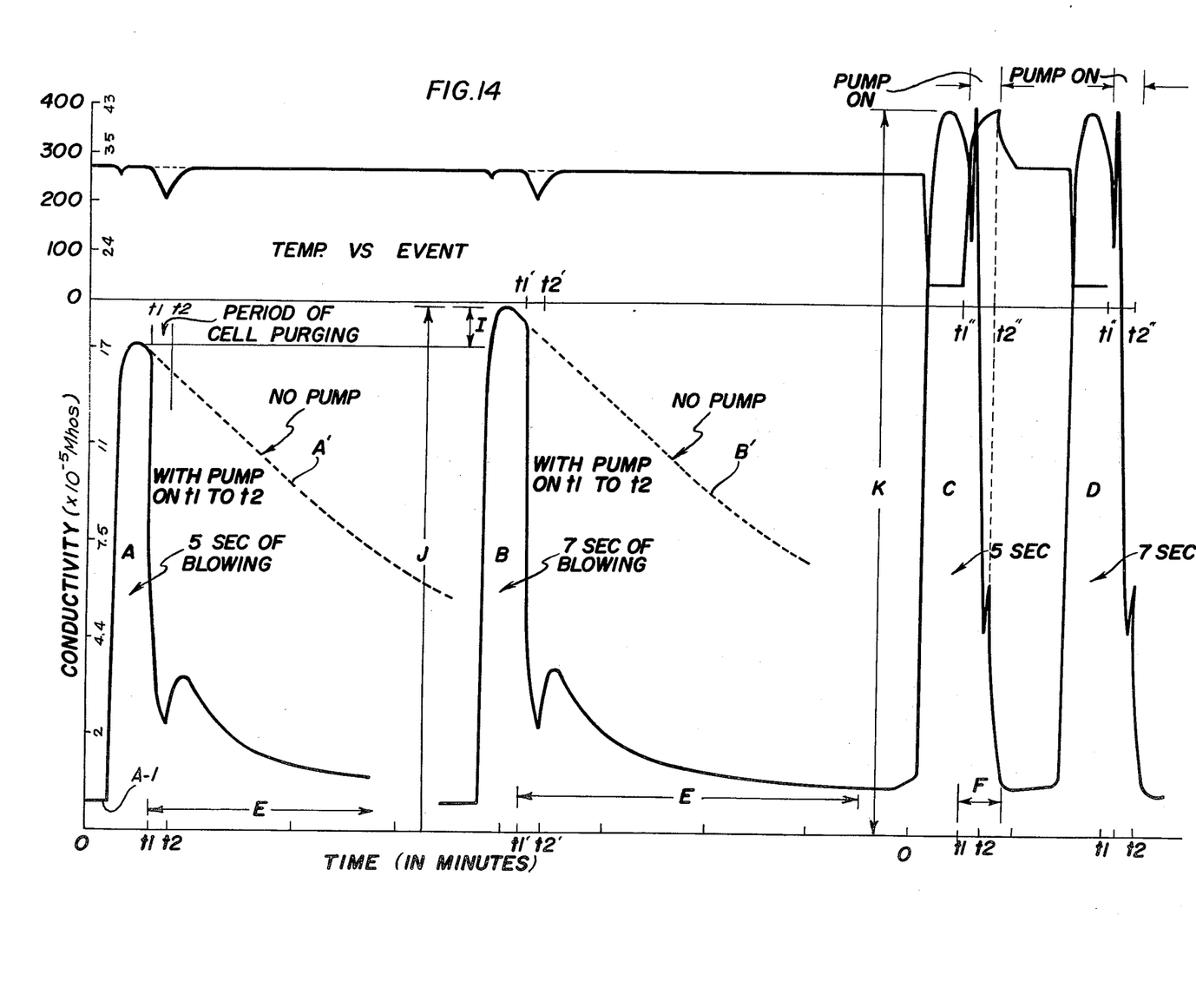
FIG. 14 is a graphical representation, similar to FIG. 13, showing temperature and conductivity of alcohol containing breath tests conducted under differing circumstances, and is useful in illustrating the advantages of the invention.

Referring now to FIG. 14, there are depicted response curves for separate tests conducted with alcohol containing breath. The dash line curve A' represents the results obtained from a detecting unit used to detect a sample, but not operated in accordance with the testing or purge features of the present invention. That is, it is first conditioned to obtain a low conductivity level at A-1 and then exposed to breath containing a 0.1% breath alcohol concentration sample for a period of 5 seconds of blowing. The solid line curve A represents the same test but, in accordance with one feature of the invention, with the purge pump activated at time $t1$ and stopped after, e.g. 15 seconds, at $t2$ to purge the cell.

The curves B and B' correspond to A and A' except that the sample is blown for a longer time (7 seconds) into the cell. Note that the peak amplitude J of B/B' is above that of A/A' by the amount "I."

The curves C and D are for similar 0.1% BAC breath samples but wherein, in accordance with a major feature of the present invention, power is cut off from both elements 24A and 24B at the same time the sample is supplied. This testing feature of the invention results, in both cases, in an increased peak amplitude K and also causes a relative insensitivity to variations in blowing durations greater than approximately 5 seconds when orifices are such that the signal peaks at approximately 5 seconds.

The curves C and D illustrate the higher peak value obtainable by the present invention. This higher value for K, relative to J, coupled with the results summarized in FIG. 13, (amplitude L being about 1.7 times M) means that the inventive mode of C and D results in a superior non-alcoholic breath to alcoholic breath ratio. That is as J of B relates to L of curve G by approximately 5 to 1, K of curves C and D relates to M of curve H by approximately 20 to 1.

Note that the inventive method results in a very rapid recovery after an alcoholic breath test (compare F with E, FIG. 14).

In the above described graphs, the temperatures are representative of typical values. However, these values are subject to considerable variation from unit to unit.

The above data and that of FIGS. 12, 13 and 14 was accumulated with a specific type of detecting unit (a Taguchi type 109) and is primarily experimental data and as such, subject to variations and possible errors in readings. However, this data is believed to be accurate, is believed to be representative and the inventors know of no contrary data.

As should now be apparent, the present invention provides for more accurate breath alcohol concentration detection with relative insensitivity to either breath pressure or length of blowing.

A tester constructed in accordance with FIG. 2 was successfully tested and yielded satisfactory results. For the purposes of giving a full disclosure, (but not for any purpose of limiting the scope of the present invention) the values of the components used are shown on FIG. 2. The particular semiconductor detector used was a Taguchi Gas Sensor model TGS-H, presently commercially available from FIGARO ENGINEERING INC., of Toyonaka City, Osaka, Japan. The purge pump 26 was a Model 595, Childre & Saunders and the meter was a Simpson 0-1 ma (with suitable shunt).

Similarly a tester was constructed in accordance with FIG. 4A and 4B and successfully tested and for the same purposes the values and identifications of the components are set out in FIGS. 4A and 4B. The detector and motor used were the same types as for the first embodiment. Thermostats were the snap action type and opened at 105°F. The heater elements 24C and 24D were made by firing a conductive ink to the glass cell. The unijunction transistors were 2N2646 (Motorola). All silicon controlled rectifiers were C103YY (General Electric). Diodes 225, 241 and 243 were 1N659 (Motorola). Zener diode 116 was 1N5223A; zener diode 220 and 188 were 1N5230A; zener diode 215 was 1N5225; diode 185D was 1N4001 and transistor 174 was 2N4403.

Those skilled in this art will recognize that numerous alternative circuits or constructions may be employed in practicing the present invention. Indeed the present inventors and their assignee may well in the future make further changes, improvements and adaptations of the disclosed testers. It is the intention, therefore, that the appended claims be construed as to cover all such variations, alternatives and equivalents as are justified by the contribution of the present invention to this art.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is;

1. The method of testing breath for alcohol content using a system including a semiconductor detecting unit, which unit has a semiconductor material exhibiting one electrical property after having been conditioned in an atmosphere essentially free of reducing substances and another property when exposed to a reducing atmosphere, such as breath entrained alcohol, and having means to heat the detector to at least two elevated temperatures, and means to sense the electrical property of the detector, comprising the steps of:
   a. conditioning the detecting unit semiconductor material at a high temperature sufficient to rapidly diminish the alcohol from the space around the material for a period of time sufficient to cause the material to exhibit one electrical property state;
   b. reducing the temperature to some lower value, and exposing a breath sample to the detector; and
   c. sensing the change in the electrical property state which change is indicative of alcohol content.

2. The method of claim 1 wherein the semiconductor material is substantially enclosed in a cell and is heated by at least one heating element, comprising:
   a. powering the heating element of the detecting unit to a temperature high enough to diminish any alcohol from the cell while causing the electrical conductance to become low;
   b. reducing power to the detecting unit heating element to lower the detecting unit's temperature;
   c. exposing the detecting unit to a flow of breath while turning off all power to the heater of the detecting unit to allow the temperature of the detecting unit to fall; and
   d. using the sensing means to sense the peak of the conductance of the detecting unit during and for a period after the flow of breath thereto and signaling this peak value as an indication of the breath alcohol concentration.

3. The method of claim 2 wherein during step (a) ambient air is flowed over the detecting unit.

4. The method of claim 2 wherein the detecting unit has two heaters embedded in the semiconductor material and both are turned on to achieve the higher temperature and only one is on to achieve the lower temperature.

5. A breath tester comprising:
   a detector having a cell with a semiconductor detecting unit mounted therein, said unit being of the type that, after being conditioned in an essentially nonreducing atmosphere at an elevated temperature, decreases in resistivity in response to exposure to an alcohol containing atmosphere;
   breath input means for allowing a gas sample to be supplied to said cell of said detector;
   means for heating the detecting unit to at least two separate elevated temperatures;
   pump means, for directing ambient air to and over the detecting unit;
   sensing and signaling means for sensing the resistivity of said detecting unit and for signaling the sensed state of its resistivity; and
   control means coupled to said sensing and signaling means, said pump means and said heating means for controlling said pump means flow of ambient air through the cell and for thereafter, stopping said pump means and controlling said heating means to lower the temperature of the detecting unit so that any resulting resistivity change may be sensed and signaled by said signaling means.

6. The breath tester of claim 5, wherein said control means controls said pump means to stop the flow over the detecting unit when the detecting unit resistivity reaches a preselected value.

7. The breath tester of claim 5, wherein said control means decreases the power supplied to said heating means when the detecting unit resistivity reaches a preselected value.

8. A breath tester comprising:
   a detector having a semiconductor detecting unit of the type that, at an elevated temperature and after being conditioned in an essentially non-reducing atmosphere, decreases in resistivity in response to exposure to an alcohol containing atmosphere;

breath input means for allowing a gas sample to be supplied to said detector;

means for heating the detector to an elevated temperature;

pump means, for directing an essentially alcohol-free atmosphere containing oxygen to and over the detecting unit;

sensing and signaling means for sensing the resistivity of said detecting unit and for signaling the sensed state of its resistivity; and control means coupled to said sensing and signaling means, said pump means and said heating means for controlling said pump means to purge the detector, and for thereafter stopping said pump means and controlling said heating means so that a breath sample may be then supplied to said breath input means and any resulting resistivity change is sensed annd signaled by said signaling means.

9. The breath tester of claim 8, wherein said control means controls said pump means to stop the flow over the detecting unit when the detecting unit resistivity reaches a preselected value.

10. The breath tester of claim 8, wherein said control means decreases the power supplied to said heating means when the detecting unit resistivity reaches a preselected value.

11. The breath tester of claim 8, wherein said control means decreases the power supplied to said detecting unit when breath is received into the detector.

12. The method of testing breath for alcohol using a semiconductor material which can exhibit a marked drop in resistivity when exposed to at atmosphere containing alcohol or other reducing gases, comprising the steps of:
 a. passing a stream of ambient air across the semiconductor material, while
 b. heating said material to an elevated temperature, for a period sufficient to cause the material to exhibit a high resistivity, and then:
 c. after stopping steps (a) and (b) above, exposing the material to a breath sample and
 d. sensing and signaling any significant resultant drop in resistivity of the material, wherein said step (b) is performed by supplying electric power to resistance heaters, which power is supplied at a high rate in the presence of the air stream and at a lower rate during any period between the steps (b) and (c).

13. In a breath testing apparatus of the type having a semiconductor sensing means the method of testing a breath sample comprising the steps of:
 a. heating the sensing means to an elevated temperature for a period sufficient to condition the element and
 b. thereafter allowing the sensing means to cool to a lower temperature and then
 c. exposing the sensing means to a breath sample.

14. The method of claim 13 wherein the sensing means is essentially $SnO_2$ and said elevated temperature is approximately 340°C.

15. The method of claim 14 wherein the sensing means is cooled to below approximately 270°C as the lower temperature and in step (b) and during step (c) taking a reading of the conductivity of the sensing means exposed to the sample.

16. The method of testing a gas sample using a semiconductor detecting unit of the type that must be conditioned and to be maintained in the conditioned state must be maintained at an elevated first temperature, comprising the steps of:
 a. conditioning the unit and keeping the unit at or about the first temperature until a gas sample is ready to be exposed to it;
 b. lowering the temperature of the unit while at about the same time exposing the unit to the sample and,
 c. measuring and signaling the resulting change in conductivity of the unit.

17. The method of claim 16 wherein the semiconductor detecting unit is essentially $SnO_2$, the elevated first temperature is approximately 270°C, and the temperature is lowered in step (b) to approximately the ambient temperature of the environment of use.

* * * * *